US012506993B2

(12) United States Patent
Kuhtz et al.

(10) Patent No.: US 12,506,993 B2
(45) Date of Patent: Dec. 23, 2025

(54) EARPHONE

(71) Applicant: Sonova Consumer Hearing GmbH, Wedemark (DE)

(72) Inventors: Jan Peter Kuhtz, Celle (DE); Thomas Trommer, Hannover (DE)

(73) Assignee: Sonova Consumer Hearing GmbH, Wedemark (DE)

(*) Notice: Subject to any disclaimer, the term of this patent is extended or adjusted under 35 U.S.C. 154(b) by 251 days.

(21) Appl. No.: 18/017,606

(22) PCT Filed: Jul. 1, 2021

(86) PCT No.: PCT/EP2021/068205
§ 371 (c)(1),
(2) Date: Jan. 23, 2023

(87) PCT Pub. No.: WO2022/022940
PCT Pub. Date: Feb. 3, 2022

(65) Prior Publication Data

US 2023/0269510 A1 Aug. 24, 2023

(30) Foreign Application Priority Data

Jul. 29, 2020 (DE) ..................... 10 2020 120 009.9

(51) Int. Cl.
*H04R 1/10* (2006.01)

(52) U.S. Cl.
CPC .................................. *H04R 1/1016* (2013.01)

(58) Field of Classification Search
CPC .. H04R 1/1016; H04R 1/1066; H04R 1/1091; H04R 1/2811; H04R 1/105; H04R 2430/01; H04R 2420/07; H04R 2460/11
See application file for complete search history.

(56) References Cited

U.S. PATENT DOCUMENTS

| | | | | |
|---|---|---|---|---|
| 7,681,577 B2 * | 3/2010 | Blanchard | A61F 11/08 | 181/134 |
| 8,348,011 B1 * | 1/2013 | Huang | H04R 25/656 | 381/328 |
| 9,807,494 B2 * | 10/2017 | Yang | H04R 1/1066 | |
| 11,381,897 B2 * | 7/2022 | Ko | H04R 1/1058 | |
| 2007/0189570 A1 * | 8/2007 | Matsuo | H04R 1/1066 | 181/135 |

(Continued)

FOREIGN PATENT DOCUMENTS

DE 102016114412 A1 9/2017

*Primary Examiner* — Carolyn R Edwards
*Assistant Examiner* — Julie X Dang
(74) *Attorney, Agent, or Firm* — ALG Intellectual Property, LLC

(57) ABSTRACT

To secure earphones in the auditory canal of a user, ear tips are used. In an improved earphone, which reduces or avoids pressure sores occurring in the ear of the user, a hard stub of the housing no longer protrudes as hitherto into the ear tip, and instead a soft receiving tube of the ear tip is secured in the housing. By means of this inverse receiving principle, the ear tip can better conform to the auditory canal and thus enhances the wearing comfort. For assembly, the tube is plugged into an opening in the housing so that a projection of the tube engages in a depression or inner shoulder behind the opening and thus secures the ear cushion on the housing.

15 Claims, 3 Drawing Sheets

(56) References Cited

U.S. PATENT DOCUMENTS

| | | | | |
|---|---|---|---|---|
| 2008/0013767 | A1* | 1/2008 | Olsen | H04R 25/654 381/328 |
| 2008/0240485 | A1 | 10/2008 | Dyer et al. | |
| 2011/0188689 | A1* | 8/2011 | Beck | H04R 25/609 381/328 |
| 2012/0051578 | A1* | 3/2012 | Parkins | H04R 1/1016 181/135 |
| 2012/0087533 | A1* | 4/2012 | Nageno | H04R 11/02 381/386 |
| 2012/0243726 | A1* | 9/2012 | Hosoo | H04R 1/1016 381/380 |
| 2013/0294634 | A1* | 11/2013 | Chen | H04R 1/1016 381/380 |
| 2014/0016808 | A1* | 1/2014 | Cherukuri | H04R 25/652 381/324 |
| 2015/0222978 | A1* | 8/2015 | Murozaki | H04R 1/1016 381/380 |
| 2015/0382094 | A1 | 12/2015 | Grinker et al. | |
| 2016/0057551 | A1* | 2/2016 | Higgins | H04R 25/656 381/328 |
| 2016/0173971 | A1* | 6/2016 | Lott | H04R 25/652 381/380 |
| 2017/0127199 | A1* | 5/2017 | Marxen | H04R 25/652 |
| 2018/0035193 | A1* | 2/2018 | Tsubone | H04R 1/24 |
| 2019/0238965 | A1* | 8/2019 | Enamito | H04R 1/1075 |
| 2020/0107099 | A1* | 4/2020 | McIntosh | H04R 1/1041 |
| 2021/0006884 | A1* | 1/2021 | Jou | H04R 1/1041 |
| 2021/0160627 | A1* | 5/2021 | Dominijanni | H04R 25/652 |

* cited by examiner

EARPHONE

The invention is related to an earphone, in particular an earphone for insertion into the auditory canal, which is also called an in-ear earphone.

BACKGROUND

Wearing comfort is an important aspect in the development of in-ear earphones. The wearing comfort is mainly noticeable at the contact points of the earphone with the user. In the case of an in-ear earphone, this is not only the auricle (concha), but in particular also the auditory canal. For securing the earphone in the auditory canal, earpads (ear tips) are commonly used. These should, on the one hand, seal the auditory canal tightly to exclude external noise, and on the other hand ensure a mechanically secure fit.

FIG. 1 shows the structure of a known earphone 100 in a sectional drawing. It comprises an earpad with a flexible earpiece 110, also called olive, which can be inserted into the user's auditory canal. The earpad includes a tube 120 which is fixedly connected to the ear tip 110 and which also resides in the user's auditory canal when the earphone is worn. Further, the earphone includes a sound transducer 140 built into a housing. The housing has a socket 130 (nozzle) which serves for attaching the earpad. The sound can pass from the sound transducer 140 through the socket 130 and the tube 120 into the auditory canal of the user. Optionally, a wax guard 115 can be provided in the earpad. The axis of symmetry $A_w$ of the sound transducer can differ from the axis of symmetry $A_s$ of the nozzle or the tube, respectively. In addition, the housing can contain further parts 150 that may have various shapes. The earpad can be attached to the housing by sliding the tube 120 onto the nozzle 130. A nose or a circumferential projection or bead 135 of the nozzle 130 thereby engages in a recess or circumferential groove 125 in the interior of the tube 120. This makes the connection detachable so that the user can replace the earpad. For example, earpads of different sizes are common to adapt to the individual size of the auditory canal, with only the earpiece 110 being wider or narrower while the tube 120 always needs to have the same diameter to fit onto the nozzle 130.

Since the nozzle 130 serves to mechanically attach the earpad and also specifies the exact angle between the earphone housing and the earpad or auditory canal, it must have a certain rigidity and therefore hardness. Typically, the tube 120 has a Shore hardness of 60-70 ShA, while the earpad 110 is softer, having a hardness of 30-40 ShA. However, the nozzle 130 is usually made of thermoplastic and is therefore harder, e.g. with a Shore hardness of approximately 75-85 ShD, which would correspond to well over 100 ShA. The Shore-A hardness measurement method only gives values up to 100, which is not sufficient for measuring thermoplastics. Therefore, the hardness of thermoplastics is usually measured using the Shore-D method for harder materials.

Thus, an optimal adaptation of the earpad to the auditory canal is hindered both by the rigidly specified direction of the earpad and by the limited flexibility of the tube 120 that is limited due to the nozzle 130. This can be uncomfortable or even painful for the user and thus reduces the wearing comfort.

For the German patent application whose priority is claimed, the German Patent and Trademark Office has researched the following documents: DE 10 2016 114 412 A1, US 2015/0382094 A1 and US 2008/0240485 A1.

SUMMARY OF THE INVENTION

The invention is therefore based on the object of providing an improved earpad for earphones, and in particular an improved attachment of the earpad, in order to reduce or avoid pressure points occurring on the part of the user. This object is achieved by an earphone according to claim 1.

According to the invention, in order to increase the wearing comfort, the attachment of the earpad is designed in such a way that there is no hard tube in the auditory canal when the earphone is worn. For this purpose, the principle of the earpad attachment is inverted in that no longer a hard nozzle of the housing protrudes into the earpad, but the softer receiving tube of the earpad is fixed in the housing. This measure allows the earpad to adapt more freely to the auditory canal and to exert less pressure on it. Thus, the wearing comfort for the user is increased. In addition, the nozzle, which was previously required as an additional assembly, is eliminated, so that the number of parts for assembling the earphone is reduced, and there is further freedom in the geometric design of the earpads.

Further advantageous embodiments are disclosed in the claims 2-11.

BRIEF DESCRIPTION OF THE DRAWINGS

Further details and advantageous embodiments are depicted in the drawings, showing in FIG. 1 a known earphone.

DETAILED DESCRIPTION

Figure 1:
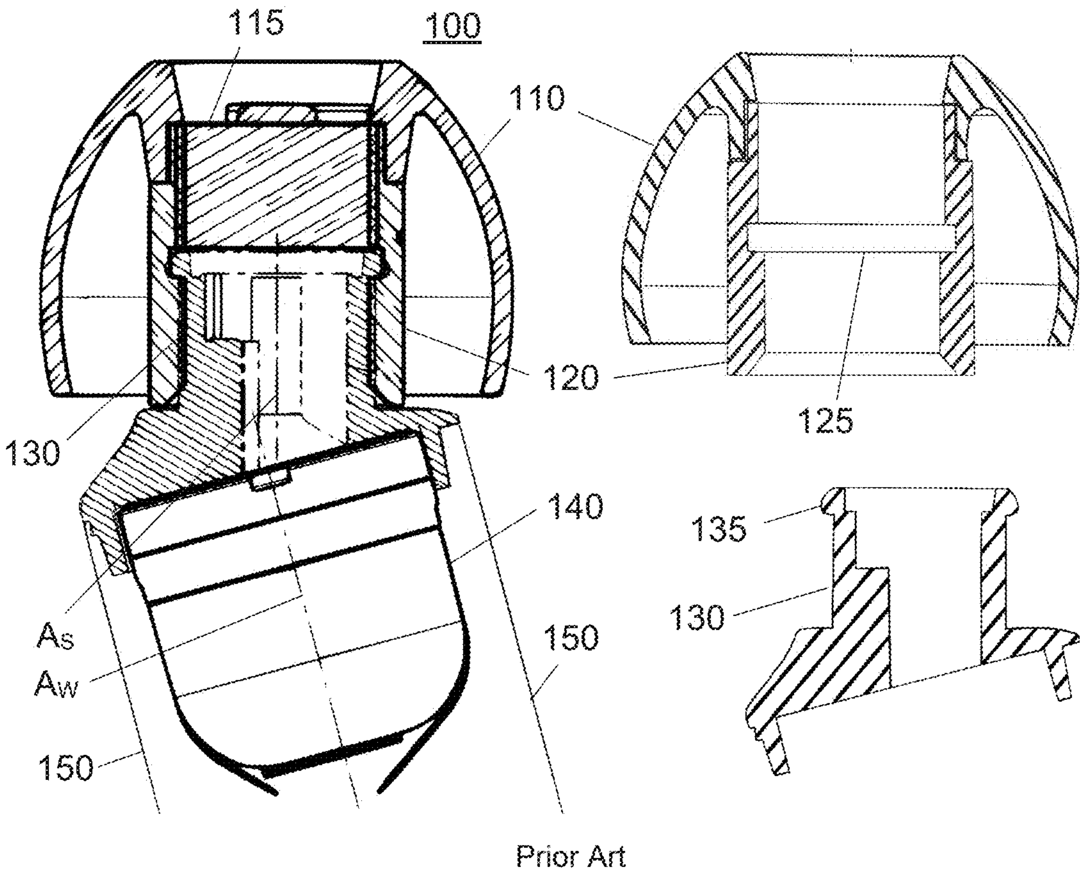
Figure 2:
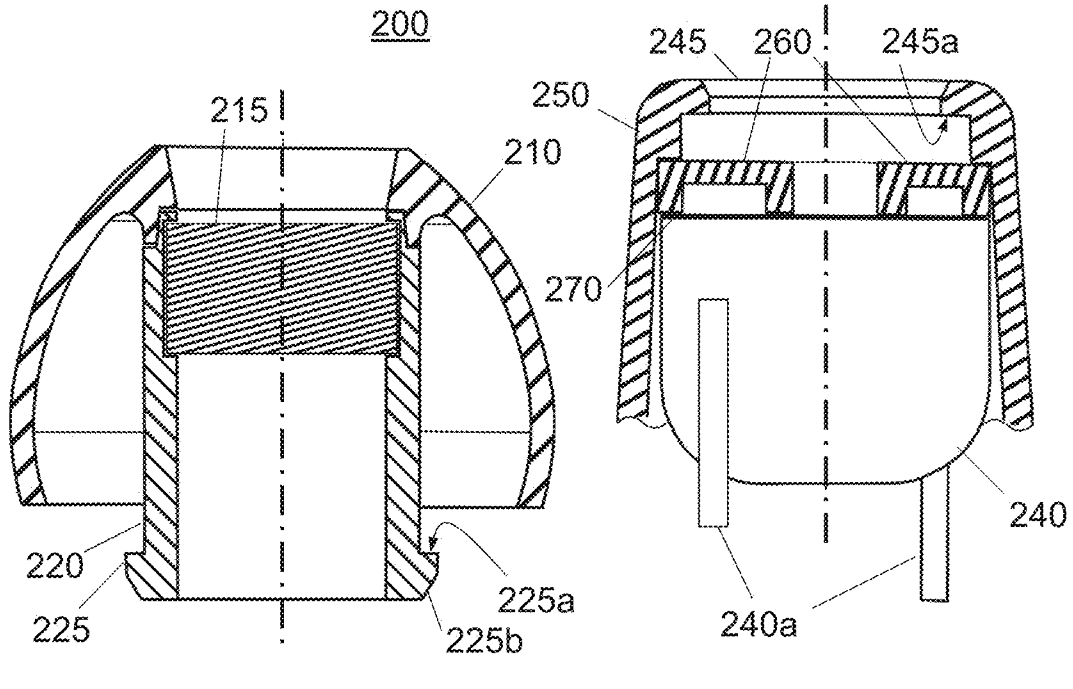
FIG. 2 components of an earphone according to the invention.

FIG. 2 shows components of an earphone 200 according to the invention. In particular, an earpad with an earpiece 210 and a tube 220 is depicted on the left, and a housing 250 in which a sound transducer 240 is mounted is depicted on the right. The earpiece (or olive, respectively) 210 of the earpad consists of a soft material, such as e.g. silicone or foam, as usual. It may have a hardness of 20-45 ShA, for example, and is therefore pleasantly soft. The inner tube 220 is made of a somewhat harder plastic, which can be a different silicone or foam, for example, and it may have a hardness of about 50-75 ShA, and in particular 55-70 ShA. This ensures that the tube 220 can be securely attached to the housing, as described below, and that it can adapt to the auditory canal while always remaining sufficiently open to allow sound output. An optional wax guard 215 can be made of a soft foam, for example. Thus, the tube 220 represents the hardest part of the earpad and thus the hardest part of those parts of the earphone that are inserted into the auditory canal (wherein the earpiece 210 can have at most the same hardness as the tube 220). Therefore, the earpad can adapt to the auditory canal better than a conventional earpad and is more comfortable to wear.

The housing 250 has an opening 245 on the top, in front of the sound transducer 240, in order to allow the sound to escape into the earpad and into the auditory canal. Inside the opening 245 is at least one indentation or portion of larger internal diameter, in this example a step 245*a*. One or more resonators 260, e.g. Helmholtz resonators, or other elements can optionally be arranged between the sound transducer 240 and the opening 245 in order to optimize the frequency response of the earphone. Optionally, also a vent may be provided (e.g., adjacent to the transducer 240, not shown) to connect the auditory canal to the environment, thereby preventing the occlusion effect. The sound transducer may have, e.g. at its rear side, electrical connections 240*a* to which the electrical signal for sound reproduction is applied. The housing 250 of the earphone can be made of a hard plastic or thermoplastic such as e.g. polycarbonate, as before, since it is practically not inserted into the auditory canal. The sound transducer 240 can be attached to the resonators 260 or to the housing 250 e.g. by means of double-sided adhesive tape 270.

The earpad is attached to the housing by means of one or more protruding projections or a circumferential bead or bulge 225 at the lower end of the tube 220. The bead 225, which may have a shoulder 225*a*, is inserted into the opening 245 of the housing 250. On the inside, this opening 245 has one or more indentations or a circumferential groove or inner shoulder 245*a*, into which the nose or bead 225 of the earpad engages and thus fastens the earpad to the housing. Since the tube 220 is flexible, as described above, it can be inserted into and removed from the opening of the housing by squeezing it with little effort. At the same time, it is hard enough to be firmly attached to the housing without detaching by itself when worn.

Figure 3:
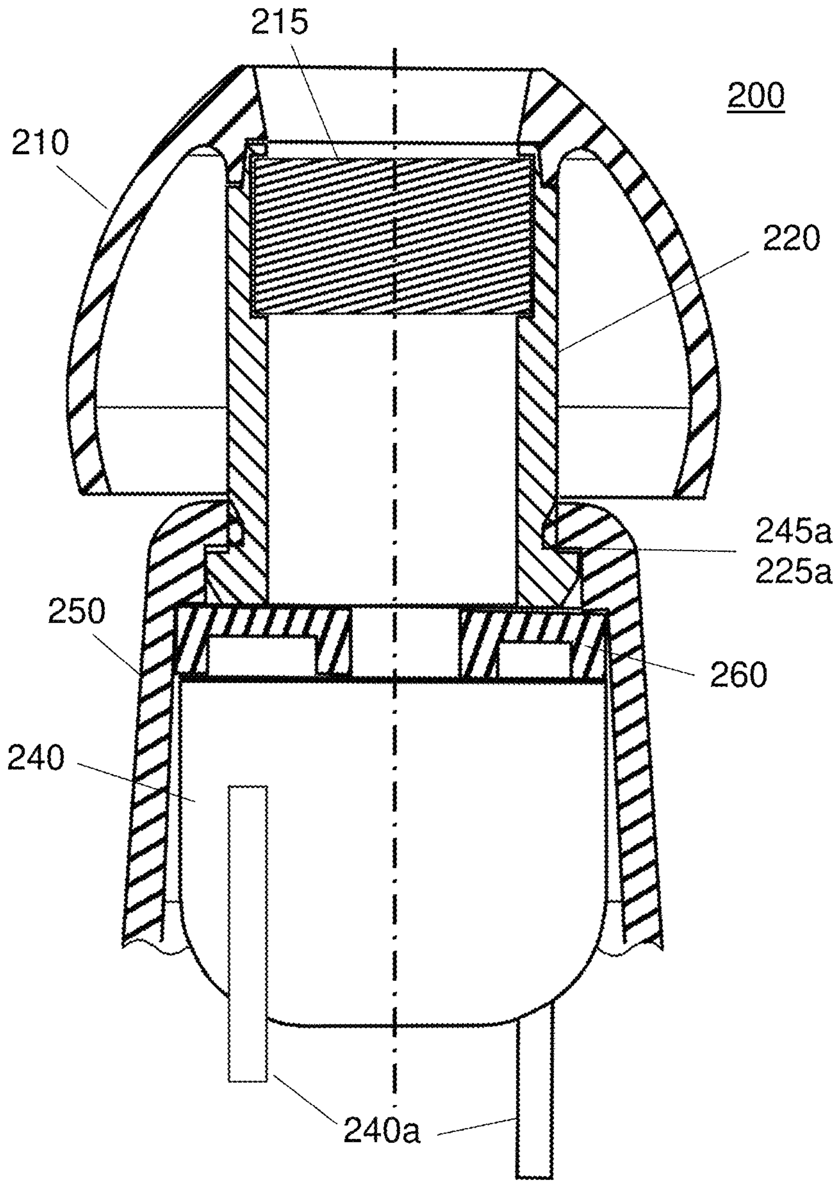
FIG. 3 an earphone according to the invention.

An earphone according to the invention, in which the earpad is attached to the housing, is shown in FIG. 3. The lower end of the soft tube 220 is located in the opening of the housing 250, so that the shoulder 225*a* of the bead 225 engages behind the opening 245 or under the circumferential inner shoulder 245*a* of the opening 245. In principle, the bead 225 does not have to be at the very bottom of the tube 220 for this purpose; the tube could also reach further into the housing. This may, for example, improve the guidance of the tube. Also, the tube 220 needs not necessarily reach to the resonators 260, as depicted in FIG. 3. The circumference of the tube 220 may be slightly larger than the circumference of the opening 245 so that it fits into the opening under pressure or tension. This is indicated by the overlapping of the two parts near the shoulders 225*a*, 245*a* in FIG. 3.

Figure 4:
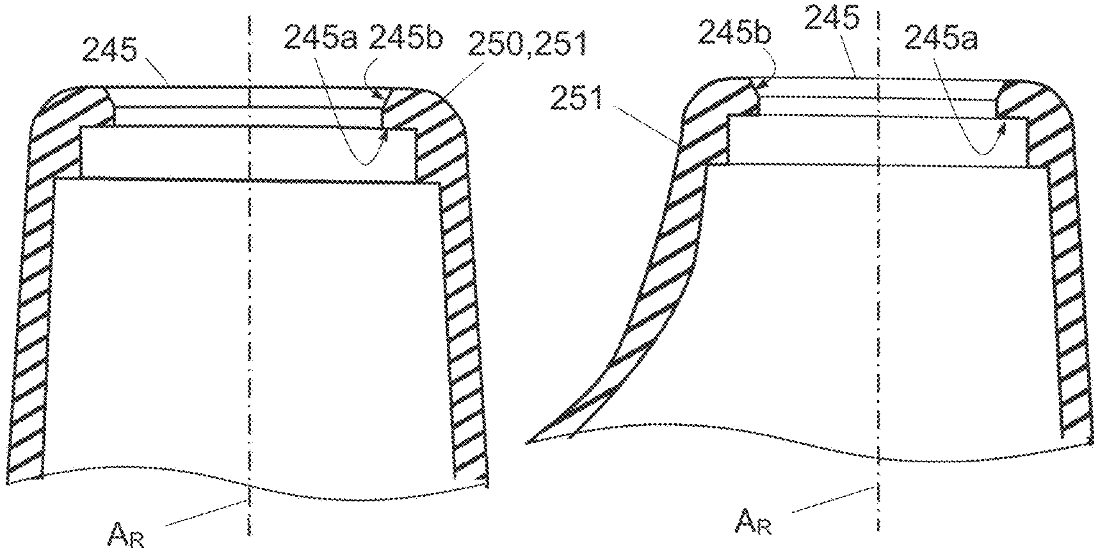
FIG. 4 two variants of a housing for an earphone, according to embodiments of the invention.

FIG. 4 shows two variants of a housing for an earphone according to the invention. The variant shown on the left can be a housing 250 that is rotationally symmetrical about the axis AR. However, the housing can also have an oval cross-section, for example, so that a rotation of 90° about the axis AR results in a section as in the variant of the housing 251 shown on the right. Unlike known housings, the housing according to the invention does not have a nozzle, but an opening 245 into which the earpad can be inserted. It is particularly advantageous if the opening 245 has a chamfer 245 *b*, i.e. its diameter is slightly increased on the outer surface, as shown in FIG. 4. This makes it easier to mount the earpad. For the same reason, also the tube 220 of the earpad can have a chamfer 225 *b* at its lower end, i.e. a somewhat reduced diameter at the very end. It should be noted that in FIG. 4 only the part of the housing facing the earpad or the auditory canal is shown, as also in the other drawings.

Figure 5:
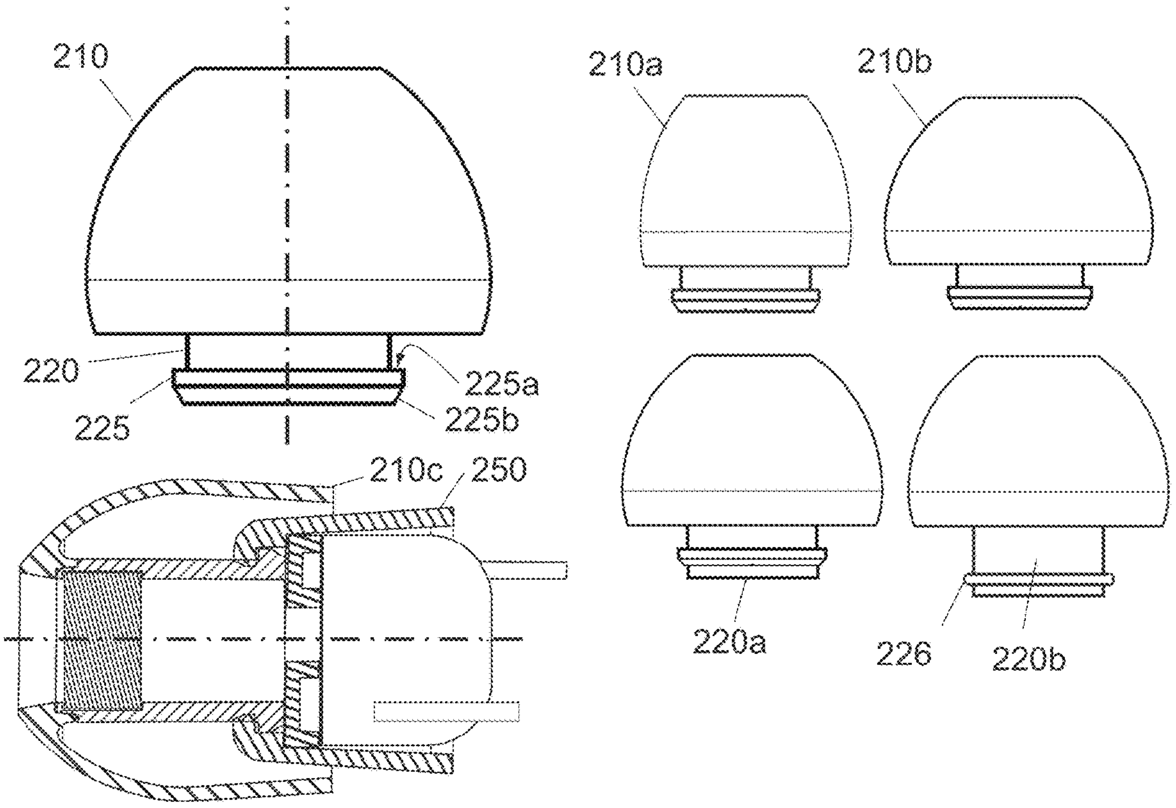
FIG. 5 several views of earpads, according to various embodiments of the invention.

FIG. 5 shows exemplary views of different embodiments of earpads according to the invention, wherein the tube 220 with the circumferential bead 225 is visible. In the variant shown on the left, the bead 225 has a shoulder 225*a* and, on the underside, a chamfer 225*b*. The chamfer 225*b* of the tube or bead, like the chamfer 245*b* of the housing, is directed outward. In this way, the chamfers or bevels face each other and facilitate the assembly of the earpad on the housing. The opposite edges or shoulders of the opening 245*a* of the housing or the bead 225*a*, on the other hand, are essentially rectangular in order to ensure a firm fit of the earpad. The earpieces or ear tips 210 of the earpads may have e.g. different outer diameters and/or lengths, while at least the lower end of the tube 220 is always shaped to fit into the opening 245 of the housing 250. However, various embodiments are also possible here. E.g., the earpiece 210*a* shown in FIG. 5 is narrower and the earpiece 210*b* is wider than the standard earpiece 210, while the earpiece 210*c* is longer than the tube 220 and at least partially covers the housing 250. In this case, only the part of the earpad protruding beyond the housing 250 is inserted into the auditory canal, while the part of the earpad that covers the housing can be used as a gripping surface when inserting or removing the earphone. Further, the tube can be longer, such as tube 220*b*, or have the bead higher up rather than at the very bottom, such as tube 220*a*. The chamfer 225*b* can be located on the bead and/or on the tube below the bead. The bead can also have a different shape, such as bead 226. In these cases, the housing must be adjusted accordingly so that the earpad is securely attached. In particular in the case of a longer tube 220*b*, the housing can have a plurality of circumferential grooves or shoulders 245*a* in order to allow different insertion depths of the earpad into the housing. Moreover, the tube 220 or the entire earpad may be oval in cross-section, rather than circular, to match the natural shape of the auditory canal more closely. A further advantage of a tube that is oval at least in sections is that it can be better aligned in a circular opening, because it makes it more difficult for the earpad to rotate relative to the housing. This effect can also be achieved by the tube having a circular cross-section while the opening is oval at least in sections. In principle, the bead or nose can also be located in the opening 245 and the recess or circumferential groove can be located in the tube 220. However, this may affect the stability of the flexible tube.

In any case, according to the invention there is no hard part of the housing in that portion of the earpad of the fully assembled earphone that is to be inserted into the auditory canal, but it is a softer part of the earpad, wherein the earpad is inserted into the housing. In the embodiments described above, the earpiece 210 is firmly connected to the inner tube 220, e.g. welded or glued. In principle, however, there are also embodiments possible in which the tube 220 is not a part of the earpad but, for example, an independent component. Likewise, in an embodiment, the earpad can in principle be made in one piece from a material with a hardness of approximately 45-50 ShA. According to the invention, all components that are intended for insertion into the auditory canal are always made of an elastic and not of a plastic (i.e. non-yielding) material.

Various features of the described, illustrated and other variants can be combined with one another.

The invention claimed is:

1. An earphone comprising:

an earpad having a soft outer earpiece and an inner tube; and a housing in which at least one transducer is located, the housing having an opening for sound outlet, wherein the tube of the earpad is user-insertable into the opening of the housing to mount the earpad to the housing;

wherein the tube of the earpad is made of a plastic that is softer than a material that the housing is made of;

wherein the tube has at least one projection on its outside and the housing has at least one recess within said opening, the recess having a diameter that is larger than a diameter of the opening; and wherein the projection of the tube engages with the recess when the earpad is being mounted to the housing.

2. The earphone according to claim 1, wherein the plastic of the tube has a Shore hardness of 50-75 ShA and the earpiece has the same or a lower hardness.

3. The earphone according to claim 1, wherein the tube is elastic and is the hardest component of that portion of the earphone that is to be inserted into a user's auditory canal.

4. The earphone according to claim 1, wherein the projection is a circumferential bead and the recess is a circumferential groove or step.

5. The earphone according to claim 1, wherein at least one of the projection and the opening have a chamfer to facilitate assembly of the earpad.

6. The earphone according to claim 1, wherein the tube and the earpiece of the earpad are made of two different kinds of silicone.

7. The earphone according to claim 1, wherein the tube of the earpad has an oval cross-section at least in sections, and wherein the opening of the housing is circular.

8. The earphone according to claim 1, wherein the tube of the earpad has a circular cross-section, and wherein the opening of the housing is oval at least in sections.

9. The earphone according to claim 1, wherein the tube and the earpiece of the earpad are made of a single kind of silicone.

10. The earphone according to claim 9, wherein the tube and the earpiece made in one piece from a material with a hardness in the range of 45-50 ShA.

11. The earphone according to claim 1, wherein the earpad is adapted to be exchangeable by a user.

12. The earphone according to claim 11, wherein the earpad is a first earpad and the earpiece of said first earpad has a first outer diameter, and wherein the user can replace the first earpad by a different earpad that has an inner tube that is equal to said inner tube of the first earpad and that is shaped to fit into the opening of the housing, and that has an outer earpiece with an outer diameter different from said first outer diameter.

13. The earphone according to claim 1, wherein the tube of the earpad is user-removable from the opening of the housing.

14. The earphone according to claim 13, wherein a user can remove the tube of the earpad from the opening of the housing by squeezing the tube.

15. The earphone according to claim 1, wherein the recess within the opening of the housing is spaced apart from an outer end of said opening.

* * * * *